(12) United States Patent
Joe (10) Patent No.: US 7,179,195 B2
(45) Date of Patent: Feb. 20, 2007

(54) DRIVING FORCE CONTROL APPARATUS AND METHOD FOR HYBRID VEHICLE

(75) Inventor: Shinichiro Joe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 281 days.

(21) Appl. No.: 10/982,883

(22) Filed: Nov. 8, 2004

(65) Prior Publication Data

US 2005/0101433 A1    May 12, 2005

(30) Foreign Application Priority Data

Nov. 7, 2003    (JP) .............................. 2003-378530

(51) Int. Cl.
*B60W 10/02* (2006.01)
(52) U.S. Cl. .......................................... 477/5; 477/905
(58) Field of Classification Search .................... 477/3, 477/5, 6, 8, 174, 180, 905; 903/942
See application file for complete search history.

(56) References Cited

U.S. PATENT DOCUMENTS

| 6,083,139 | A  | * | 7/2000 | Deguchi et al. ................ 477/5 |
| 6,233,508 | B1 | * | 5/2001 | Deguchi et al. ............ 903/942 |
| 6,364,807 | B1 | * | 4/2002 | Koneda et al. ................ 477/5 |
| 6,602,164 | B2 |   | 8/2003 | Yoshiaki et al. |
| 6,881,167 | B2 | * | 4/2005 | Inada ............................. 477/5 |
| 7,021,409 | B2 | * | 4/2006 | Tamor ........................... 477/3 |
| 2005/0054480 | A1 | * | 3/2005 | Ortmann et al. ............... 477/6 |

FOREIGN PATENT DOCUMENTS

| JP | 11-082261 A   | 3/1999 |
| JP | 2000-204999 A | 7/2000 |
| JP | 2001-219765 A | 8/2001 |
| JP | 2003-200758 A | 7/2003 |

* cited by examiner

*Primary Examiner*—Roger Pang
(74) *Attorney, Agent, or Firm*—Foley & Lardner LLP

(57) ABSTRACT

A driving force control apparatus for a hybrid vehicle includes a section for determining a target driving torque based on an accelerator opening degree and a vehicle speed, a section for calculating a compensating toque for compensating for decrease in a vehicle driving force otherwise caused at the time of engagement of an engine clutch, a section for calculating a vehicle-driving motor torque by subtracting the compensating torque from a maximum motor torque, a section for instructing the engine clutch to start engagement, and a section that corrects the target driving torque to a corrected target driving torque that can be realized by the vehicle-driving motor torque after engagement of the engine clutch is started and before the engagement of the engine clutch is completed. A driving force control method is also provided.

10 Claims, 7 Drawing Sheets

FIG.1

FIG.2A
MAIN ROUTINE

FIG.2B
ENGAGEMENT DETERMINATION SUBROUTINE

FIG.2C
ENGAGEMENT CONTROL SUBROUTINE

DRIVING FORCE CONTROL APPARATUS AND METHOD FOR HYBRID VEHICLE

BACKGROUND OF THE INVENTION

The present invention relates to a driving force control apparatus and method for a hybrid vehicle having a transmission for transmitting power to an output shaft connected to driving wheels after combining powers of an engine and at least one motor/generator and an engine clutch for selectively engaging the engine to the transmission.

In a hybrid vehicle having an engine clutch for controlling transfer of power between an engine and a transmission, it is a usual practice, when the engine clutch is engaged to start the engine after starting of the vehicle in an electric vehicle mode, to create a semi-clutch state so that a torque transfer capacity is gradually increased to thereby decrease vehicle acceleration and deceleration shocks as disclosed in Unexamined Japanese Patent Publication No. 2001-219765.

SUMMARY OF THE INVENTION

However, a conventional driving force control apparatus for a hybrid vehicle encounters the following problem. Namely, at the time of depression of an accelerator such as the time of full-throttle acceleration by fully depressing an accelerator or intermediate acceleration, an engine clutch is engaged to start the engine if a sufficient driving force cannot be obtained only by an electric motor. In such a case, if the electric motor has already been driven so as to generate the maximum torque, the conventional driving force control apparatus encounters the following problem.

(1) There is a possibility of giving a driver a vehicle decelerating feel since decrease in the driving force is inevitably caused due to dragging of the engine clutch and cannot be compensated for.

(2) Since the engine clutch is engaged in a way as to create a semi-clutch state, a long time is required for completing engagement of the clutch, so that there is caused a large decrease in the driving force during the time from start of the engine to start of addition of engine torque to the driving force, thus causing a delay in acceleration of the vehicle.

It is accordingly an object of the present invention to provide a driving force control apparatus for a hybrid vehicle which can eliminate vehicle acceleration and deceleration shocks otherwise caused when a mode of operation of the vehicle is changed from an electric vehicle mode to a hybrid mode and which can attain fast starting of the engine thereby enabling the vehicle to accelerate with a good responsiveness and without delay.

To achieve the above object, there is provided according to an aspect of the present invention a driving force control apparatus for a hybrid vehicle having an engine, a motor/generator, a transmission for transmitting powers of the engine and the motor/generator to driving wheels of the vehicle, and an engine clutch disposed between the engine and the transmission, the driving force control apparatus comprising a target driving torque determining section that determines a target driving torque based on an accelerator opening degree and a vehicle speed, a compensating torque calculating section that calculates a compensating toque for compensating for decrease in a vehicle driving force otherwise caused at the time of engagement of the engine clutch, a vehicle-driving motor torque calculating section that calculates a vehicle-driving motor torque by subtracting the compensating torque from a maximum motor torque of the motor/generator, an engagement instructing section that instructs the engine clutch to start engagement, and a driving torque correcting section that corrects the target driving torque to a corrected target driving torque that can be realized by the vehicle-driving motor torque after engagement of the engine clutch is started and before the engagement of the engine clutch is completed.

According to another aspect of the present invention, there is provided a driving force control method for a hybrid vehicle having an engine, a motor/generator, a transmission for transmitting powers of the engine and the motor/generator to driving wheels of the vehicle, and an engine clutch disposed between the engine and the transmission, the driving force control method comprising determining a target driving torque based an accelerator opening degree and a vehicle speed, calculating a compensating toque for compensating for decrease in a vehicle driving force otherwise caused at the time of engagement of the engine clutch, calculating a vehicle-driving motor torque by subtracting the compensating torque from a maximum motor torque of the motor/generator, instructing the engine clutch to start engagement, and correcting the target driving torque to a corrected target driving torque that can be realized by the vehicle-driving motor torque after engagement of the engine clutch is started and before the engagement of the engine clutch is completed.

DESCRIPTION OF THE PREFERRED EMBODIMENT

Figure 1:
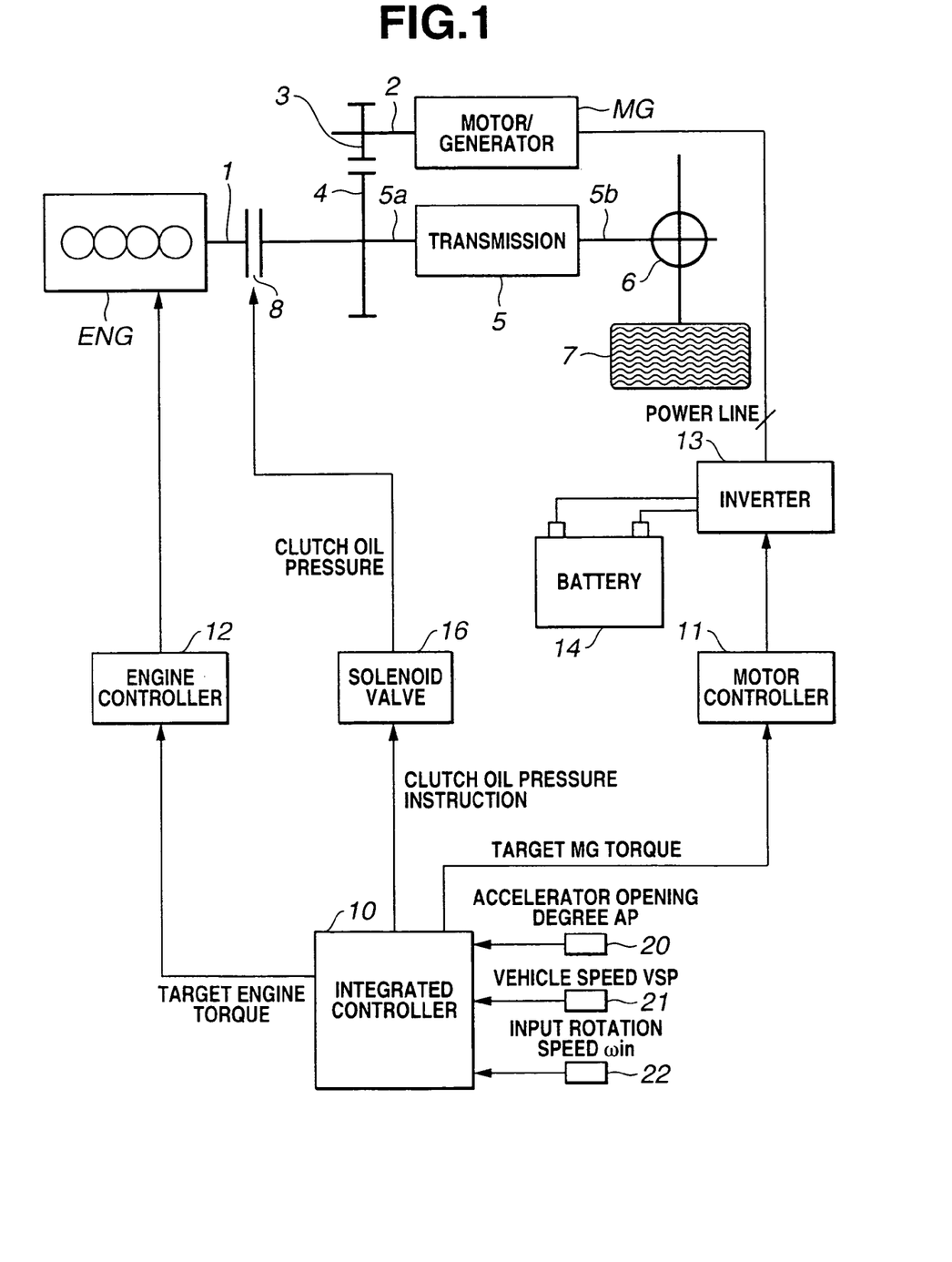
FIG. 1 is a schematic view of a hybrid vehicle in which a driving force control apparatus according to a first embodiment of the present invention is incorporated.

Referring first to FIG. 1, a driving force control apparatus for a hybrid vehicle according to a first embodiment of the present invention will be described.

The hybrid vehicle includes transmission (power transmission means) 5 consisting of an automatic transmission or a continuously variable transmission. To input shaft 5a of transmission 5 is connected by way of engine clutch 8 output shaft 1 of engine ENG, and to output shaft 5b of transmission 5 is connected by way of differential gear 6 driving wheels 7. To input shaft 5a of transmission 5 is connected by way of fixed reduction gears 3, 4 output shaft 2 of motor/generator MG. By this, transmission 5 supplies power to driving wheels 7 after combining powers of engine ENG and motor/generator MG. In the meantime, transmission 5 and motor/generator MG are arranged in parallel with each other so as to constitute a hybrid transmission.

The hybrid vehicle has two operation modes in which it is operated selectively depending upon an operating condition of engine clutch 8. Namely, when engine clutch 8 is released or disengaged, the vehicle is operated in an electric vehicle mode in which the vehicle is driven only by the power of motor/generator MG. When engine clutch 8 is engaged, the vehicle is operated in a hybrid mode in which the vehicle is driven by the powers of engine ENG and motor/generator MG.

The driving force control apparatus includes integrated controller 10 for performing an integrated control of the overall energy, engine controller 12 for controlling engine ENG, motor controller 11 for controlling motor/generator MG of the power train described above, inverter 13 for supplying electricity to motor/generator MG, battery 14 for storing electric energy, and solenoid valve 16 for producing oil pressure to be supplied to engine clutch 8.

Integrated controller 10 selects a driving mode that is capable of attaining a driving force required by a driver in accordance with accelerator opening degree AP inputted from accelerator opening degree sensor 20, vehicle speed VSP (proportional to an output shaft rotation speed) inputted from vehicle speed sensor 21, input rotation speed ω in of transmission 5 inputted from input rotation speed sensor 22, etc. and give instructions on target MG torque and target engine torque to motor controller 11 and engine controller 12, respectively while supplying a driving signal to solenoid valve 16.

Then, with reference to the flow chart of FIGS. 2A to 2C, a driving force control at the time of engagement of engine clutch 8, which is executed in integrated controller 10, will be described.

Figure 2A:
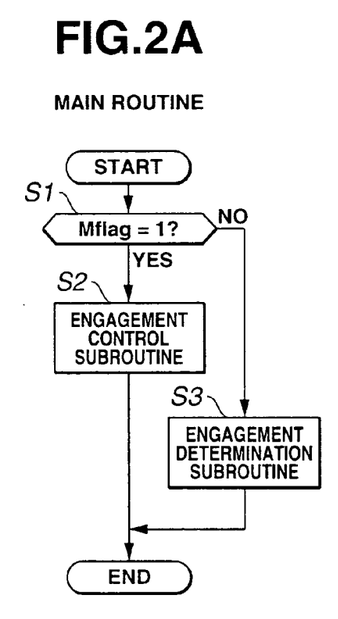
FIGS. 2A, 2B and 2C are flow charts showing a main routine of a driving force control process, an engagement determination subroutine and an engagement control subroutine, respectively, which are executed in an integrated controller in the first embodiment.

In FIG. 2A is shown a main routine of a driving force control process at the time of engagement of engine clutch.

In step S1, it is determined whether or not engine clutch engagement flag Mflag is 1. If engine clutch engagement flag Mflag is 1, engine clutch is in engagement and the control proceeds to an engagement control subroutine in step S2. If engine clutch engagement flag Mflag is 0, engine clutch is not in engagement and the control proceeds to an engagement determination subroutine in step S3.

Figure 2B:
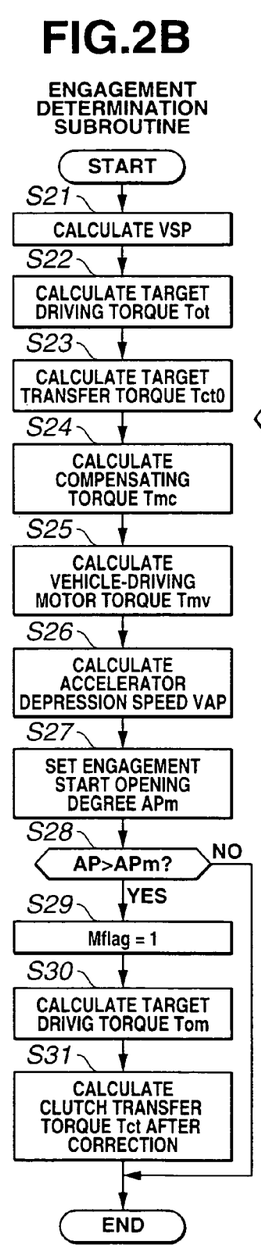

In FIG. 2B is shown the engagement determination subroutine.

In step S21, vehicle speed VSP is calculated from output rotation speed ω out of transmission 5 by using the following expression, and then the control proceeds to step S22.

$$VSP = Kv \cdot \omega out \quad (1)$$

where Kv is a constant determined by a tire radius or a final gear ratio.

Figure 3:
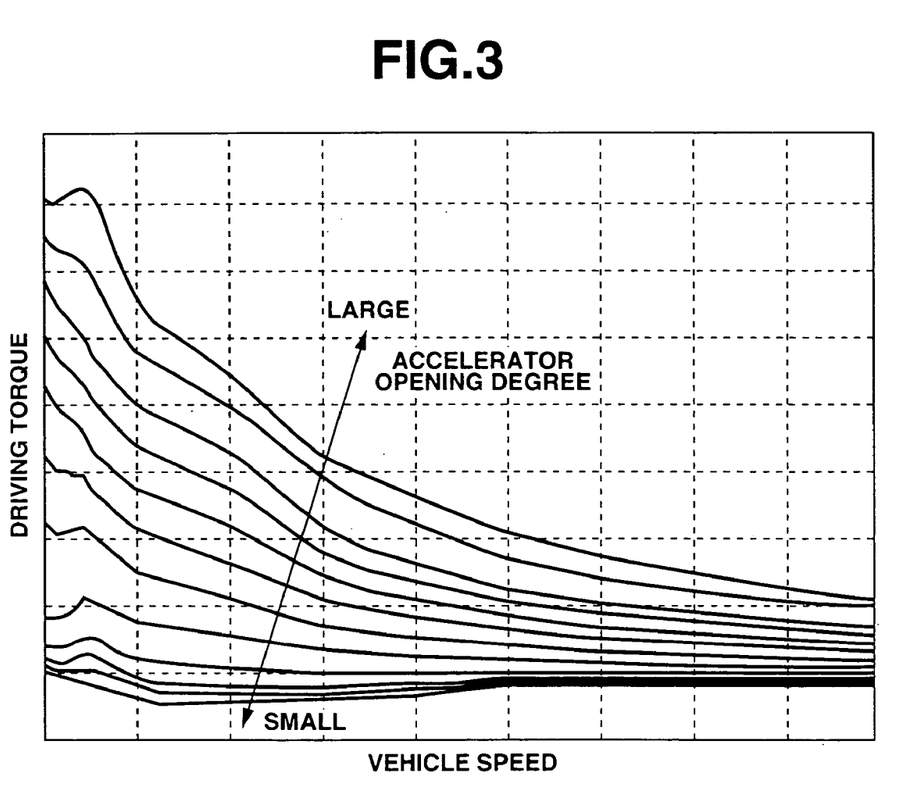
FIG. 3 is a driving torque map used in a driving force control in the first embodiment.

In step S22, target driving torque Tot is calculated from vehicle speed VSP and accelerator opening degree AP by using a map shown in FIG. 3 and the control proceeds to step S23 (target driving force setting or determining means).

In step S23, target transfer torque Tct0 of engine clutch 8 is set and the control proceeds to step S24. In this connection, target transfer torque Tct0 can be given by a certain fixed value or by a value variable depending upon variations of target driving torque Tot and vehicle speed VSP.

In step S24, compensating or supplemental torque Tmc that is a motor torque value for supplementing a transfer torque of engine clutch 8 (compensating or supplemental torque calculating section or means) and the control proceeds to step S25.

In the meantime, vehicle driving torque To, transfer torque Tc of engine clutch 8 and motor torque Tm have a relation that is represented by the following expression.

$$To = im \cdot Tm - ic \cdot TC \quad (2)$$

where im is a transmission ratio between an input rotation speed and an output rotation speed of transmission 5 and ic is a transmission ratio between a motor rotation speed and the output rotation speed.

Thus, from the expression (2) is obtained the following expression for obtaining compensating torque Tmc that compensates for Tcto so that the driving force is not varied.

$$Tmc = ic \cdot Tcto / im \quad (3)$$

In step S25, vehicle-driving motor torque Tmv is calculated (vehicle-driving motor toque calculating section or means) and the control proceeds to step S26.

Figure 4:
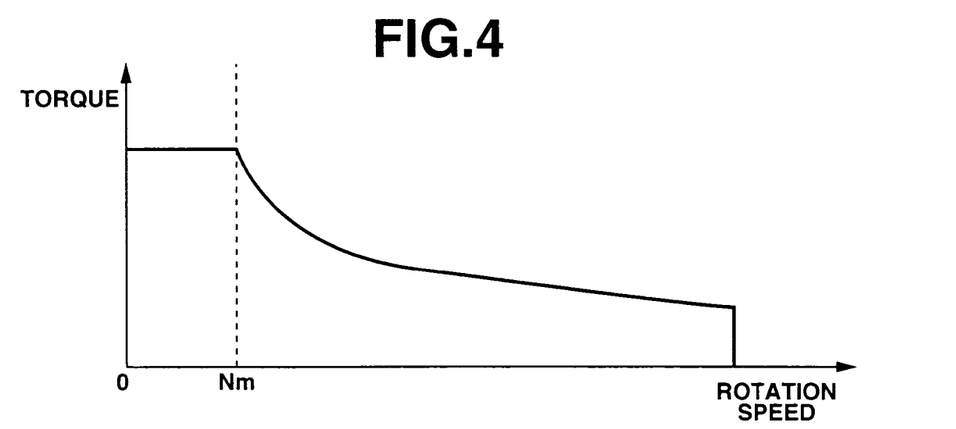
FIG. 4 is a motor characteristic view used in the driving force control in the first embodiment.

First, maximum motor torque Tmax is calculated from motor rotation speed ωm at the present time by using a motor characteristic map shown in FIG. 4. Then, by using the following expression, vehicle-driving motor torque Tmv is calculated from maximum motor torque Tmmax and compensating torque Tmc.

$$Tmv = Tmmax - Tmc \quad (4)$$

From expressions (2), (3), (4), vehicle-driving torque To obtained by maximum motor torque Tmmax (i.e., maximum vehicle-driving torque Tomax) is represented by the following expression.

$$\begin{aligned} Tomax &= im \cdot Tmmax - ic \cdot Tct0 \quad (5) \\ &= im(Tmc + Tmv) - ic \cdot Tct0 \\ &= ic \cdot Tct0 + im \cdot Tmv - ic \cdot Tct0 \\ &= im \cdot Tmv \end{aligned}$$

In step S26, accelerator depression speed VAP is calculated and the control proceeds to step S27. For example, accelerator depression speed VAP can be calculated based on a difference in the accelerator opening degree between the last control cycle and the present control cycle.

In step S27, accelerator opening degree Apm for determination of start of engagement of engine clutch 8 is set by the following process.

(1) By using the expression (5), maximum vehicle-driving torque Tomax that can be realized by vehicle-driving motor torque Tmv is calculated.

(2) By using the driving force map shown in FIG. 3, accelerator opening degree Apm0 corresponding to maximum vehicle-driving torque Tomax is calculated from maximum driving torque Tomax and vehicle speed VSP.

Figure 5:
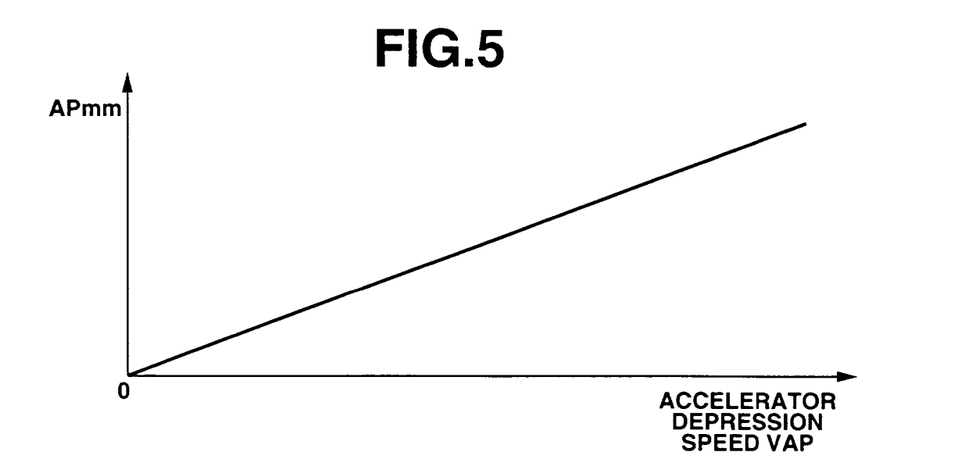
FIG. 5 is a characteristic view showing a relation between an accelerator depression speed and an accelerator opening degree correction value at start of engagement of an engine clutch.

(3) By using the map shown in FIG. 5, correction amount Apmm of accelerator opening degree Apm0 is set in accordance with accelerator depression speed VAP.

(4) From accelerator opening degree Apm0 and correction amount Apmm, accelerator opening degree APm after correction in response to which start of engagement of engine clutch 8 is determined, is calculated by using the following expression.

$$APm=APm0-APmm \quad (6)$$

In step S28, it is determined whether or not accelerator opening degree AP is larger than accelerator engagement start determination opening degree APm. If accelerator opening degree AP is larger than engagement start determination accelerator opening degree APm, the control proceeds to step S29 to start engagement of engine clutch 8 (engagement instructing section or means). If smaller, the subroutine is ended.

In step S29, since engagement of engine clutch 8 is started, clutch engagement flag Mflag is set to 1, and the control proceeds to step S30.

In step S30, in order to make target driving torque Tom corresponding to engagement start determination accelerator opening degree APm after correction be corrected target driving torque in the process of engagement of engine clutch 8, corrected target driving torque Tom is calculated from engagement start determination accelerator opening degree APm and vehicle speed VSP by using the map shown in FIG. 3 (driving force correcting section or means) and the control proceeds to step S31.

In step S31, by making use of increase in the surplus of motor torque for compensation of engine clutch engagement torque, which is caused by decrease in the target driving torque in the process of engagement of engine clutch 8 in response to decrease in the accelerator opening degree for starting engagement of engine clutch 8, the target transfer torque of engine clutch 8 is increased.

First, similarly to the relation shown by the expression (5), motor torque Tmm realizing target driving torque Tom is calculated by using the following expression.

$$Tom=im \cdot Tmm \quad (7)$$

Then, by using the following expression, compensating torque Tct after correction is calculated.

$$Tct=Tmmax-Tmm \quad (8)$$

This Tct is determined as clutch transfer torque after correction.

Figure 2C:
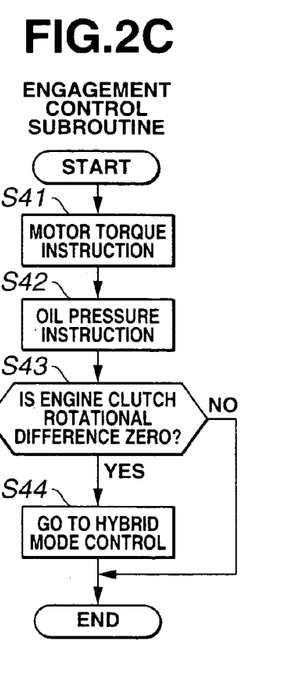

FIG. 2C shows a subroutine for clutch engagement control.

In step S41, an instruction on maximum motor torque Tmmax is given to motor/generator MG and the control proceeds to step S42.

In step S42, solenoid valve 16 is driven so as to realize clutch transfer torque Tct after correction that is set at the time of change of mode, and the control proceeds to step S43.

In step S43, it is determined whether or not the difference in the rotation speed between engine clutch plates (i.e., the difference between the engine rotation speed and the input rotation speed) is zero. If the answer is affirmative, the control proceeds to step S44. If the answer is negative, the routine is ended.

In step S44, it is determined that engagement of engine clutch 8 is completed in step S43 and the control goes to the hybrid mode.

[Operation of the Driving Force Control Apparatus]

A driving force control at the time of engagement of engine clutch 8 is started in response to an instruction to change the electric vehicle mode to the hybrid mode. Thus, at first, engine clutch 8 is not in the process of engagement but engine clutch engagement flag Mflag is 0. Thus, the control proceeds from step S1 in the flow chart of FIG. 2A to the subroutine in step S3.

In the subroutine shown in FIG. 2B, vehicle speed VSP is calculated in step S21. In step S22, target driving torque Tot is calculated from vehicle speed VSP and accelerator opening degree AP. In step S23, target transfer torque Tct0 of engine clutch 8 is set. In step 24, compensating torque Tmc is calculated. In step 25, vehicle-driving motor torque Tmv is calculated. In step S26, accelerator depression speed VAP is calculated. In step 27, accelerator opening degree APM for determination of start of engagement of engine clutch 8 is set.

In step S28, a comparison between detected accelerator opening degree AP and clutch engagement start determination accelerator opening degree APM is made. During AP≦APm, the subroutine is repeated. Thereafter, if it comes the time when accelerator opening degree AP becomes larger than engagement start determination accelerator opening degree APm, the control proceeds to step S29 to start engagement of engine clutch 8. However, prior to start of engagement of engine clutch 8, engine clutch engagement flag Mflag is set to 1. Then, in step S30, it is calculated target driving torque Tom in the process of engagement of engine clutch 8, which corresponds to engagement start determination accelerator opening degree APm after correction and which can be realized by a motor toque equal to or smaller than the maximum motor torque. In step S31, compensating torque Tct after correction is calculated.

Then, since in step S29 engine clutch engagement flag Mflag is set to 1, the control proceeds from step S1 in the flow chart of FIG. 2A to engagement control subroutine in step S2. In the engagement control subroutine in FIG. 2C, an instruction on maximum motor torque Tmmax is given to motor/generator MG in step S41. In step S42, solenoid valve 16 is driven so as to realize clutch transfer torque Tct after correction. In step S43, it is determined whether or not the rotational difference between the clutch plates is zero. The motor control in step S41 and the engine clutch engagement control in step S42 are repeated until the rotational difference between the clutch plates becomes zero. When the rotational difference becomes zero, the control proceeds to the hybrid mode control.

[Effect of the Driving Force Control Apparatus]

For example, in related art, at the time of depression of an accelerator such as the time of full-throttle acceleration or intermediate acceleration and in case an engine clutch is engaged to start engine since a driving force only by a motor is insufficient, there is a possibility of causing the following problems if the motor has been driven to produce a maximum torque.

Figure 6:
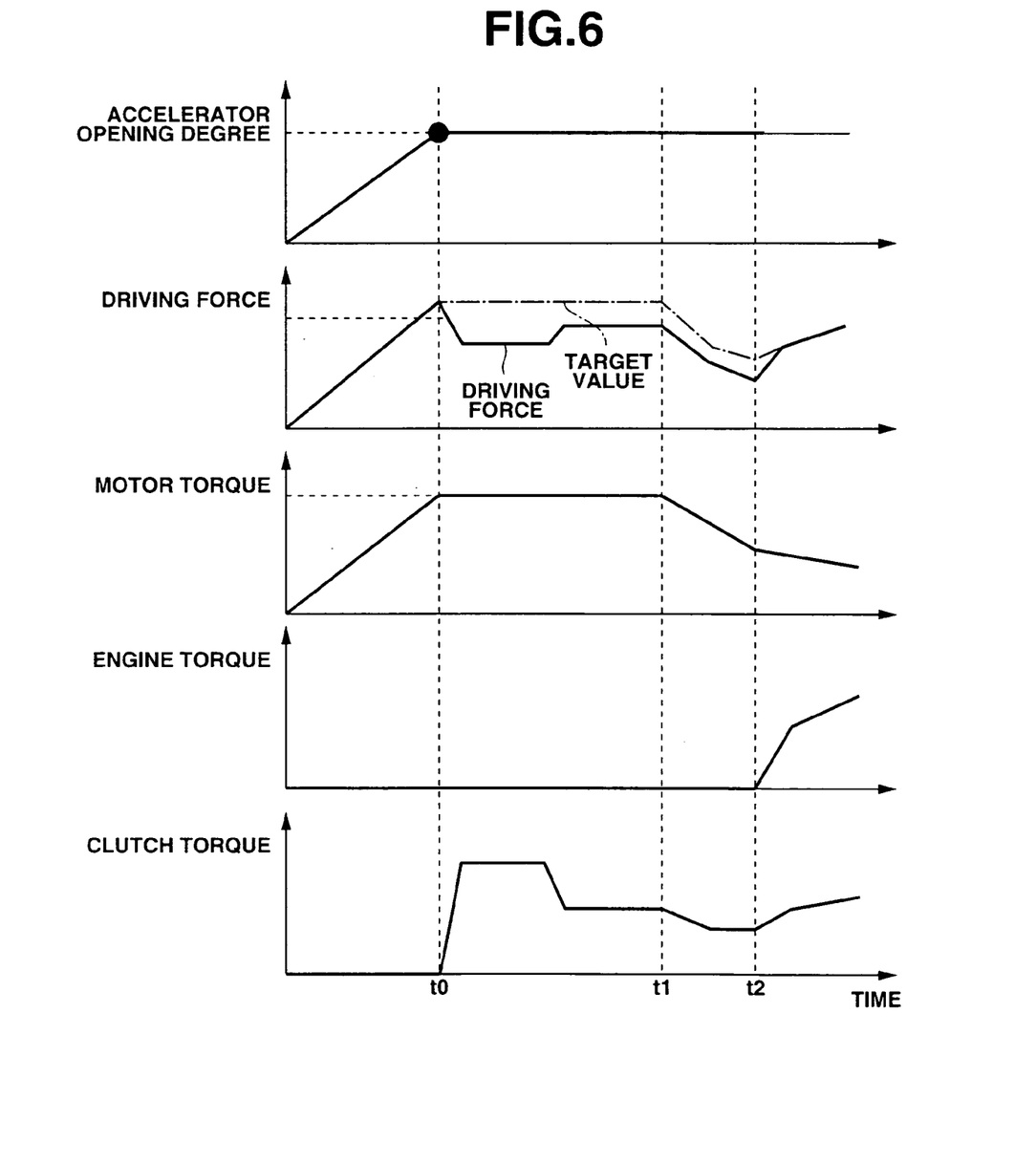
FIG. 6 is a time chart of showing respective characteristics of accelerator opening degree, driving force, motor torque, engine torque and clutch toque at the time of engagement of an engine clutch according to a related art.

(1) Even if the engine clutch is engaged in a semi-clutch state, it is impossible to compensate for decrease in driving force due to dragging of the engine clutch since the motor has already been driven to produce a maximum torque. Accordingly, as shown in the driving force characteristic shown in FIG. 6, the driving force drops when engagement of the engine clutch is started, thus causing a possibility that the driver feels deceleration of the vehicle.

(2) If the engine clutch is engaged in a semi-clutch state, the time necessary for completing engagement of the engine clutch becomes longer and the time necessary for the engine speed to increase up to a value enabling the engine to start (t2 in FIG. 6) becomes longer. Further, though the motor rotation speed increases in proportion to increase of the vehicle speed, the rated torque decreases in inverse proportion to the motor rotation speed when the motor rotation speed becomes equal to or higher than a certain value (Nm in FIG. 4) due to the motor characteristic shown in FIG. 4. In the electric vehicle mode, the driving force is proportional to the motor torque. Thus, if the time necessary for the engine rotation speed to increase up to a value enabling the engine to start becomes longer, decrease in the driving torque after the engine is started and before addition of the engine torque to the driving force is started becomes larger, thus causing a possibility of delay in acceleration of the vehicle.

In contrast to this, since in the first embodiment and in the process (1) of step S27 the accelerator opening degree corresponding to the maximum driving torque Tomax is determined as the largest accelerator opening degree for determination of start of engagement of the engine clutch 8, the target driving torque before and in the process of engagement of the engine clutch 8 does not become larger than the maximum driving torque Tomax. Accordingly, the target driving torque in the process of engagement of the engine clutch 8 becomes equal to or smaller than the maximum driving torque Tomax, so that as shown by the driving force characteristic represented by the solid line in FIG. 7, start of engagement of the engine clutch 8 does not cause such a drop or decrease of the driving force and a strange feel concerning acceleration as in the related art.

Further, since in step S27 the accelerator opening degree APm at which engagement of the engine clutch 8 is started is made smaller as the accelerator depression speed VAP becomes faster, the target driving torque Tomax during engagement of the engine clutch 8 becomes further smaller. Accordingly, the engine clutch torque can be compensated for more assuredly.

Figure 7:
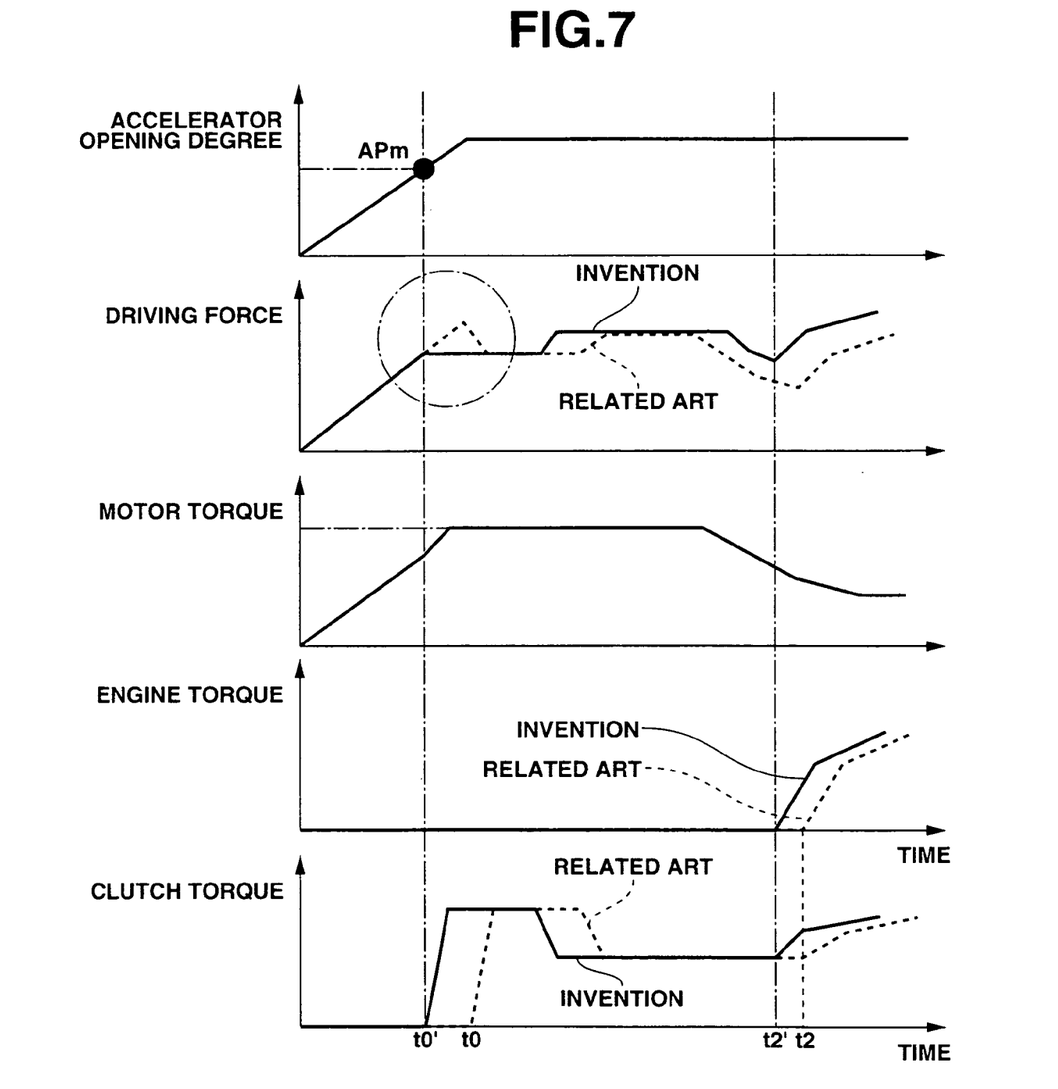
FIG. 7 is a time chart of showing respective characteristics of accelerator opening degree, driving force, motor torque, engine torque and clutch toque at the time of engagement of an engine clutch according to the embodiment of the present invention.

Further, by making smaller the accelerator opening degree APm at which engagement of the engine clutch 8 is started as the accelerator depression speed VAP becomes faster, the time at which engagement of the engine clutch 8 is started becomes earlier (t0→t0' in FIG. 7). Thus, the time at which the engine ENG is started becomes earlier as compared with that in the related art, thus making shorter the time since the accelerator is depressed till a large driving force is produced thereby improving the responsiveness to acceleration requirement and making earlier the time at which the vehicle reaches a required speed.

Further, since the clutch transfer torque Tct after correction calculated in step S31 is larger as compared with that Tct0 before correction, the time necessary for engagement of the engine clutch 8 becomes shorter and the time at which the engine ENG is started becomes earlier (t2→t2' in FIG. 7), thus making further shorter the time since the accelerator is depressed till the engine ENG produces a large driving force thereby improving the responsiveness to acceleration requirement and making earlier the time at which the vehicle reaches a required speed.

The driving force control apparatus for a hybrid vehicle according to the first embodiment of the present invention can produce the following effects.

(1) The driving force control apparatus is configured to provide the motor with a surplus of torque that can compensate for the torque caused by dragging of the engine clutch. Accordingly, vehicle acceleration and deceleration shocks otherwise caused by a drop of driving force when engagement of the engine clutch is started can be eliminated. Further, since accelerator opening degree in response to which engagement of the engine clutch 8 is started is made smaller as compared with that in the related art, the time at which engagement of the engine clutch 8 is started is made earlier as shown in FIG. 7, thus making earlier the time at which engine ENG is started thereby making it possible to start engine ENG and accelerate the vehicle at an earlier time.

(2) Since the driving force control apparatus is configured to set the accelerator opening degree in response to which engagement of the engine clutch 8 is started on the basis of the assumption that the larger the accelerator depression speed VAP becomes, the larger the final accelerator opening degree and the target driving force become, the time at which the engine speed increases up to a value enabling the engine ENG to start is made earlier, thus enabling the vehicle to accelerate at a further earlier time.

(3) Since the driving force control apparatus is configured to increase the torque transfer capacity of engine clutch 8 in a semi-clutch state as the accelerator depression speed VAP increases, the time necessary for completing engagement of the engine clutch 8 becomes shorter and the time for the engine rotation speed to increase up to a value that enables the engine ENG to start can become further earlier so that acceleration of the vehicle can be attained at a further earlier time. Further, since a predetermined value of accelerator opening degree at which engagement of the engine clutch 8 is instructed is set so that the faster the accelerator depression speed VAP becomes, the smaller the predetermined value of accelerator opening degree becomes by the above-described effect (2), the surplus of motor torque is increased. Since the torque transfer capacity of the engine clutch 8 is increased in accordance with increase in the surplus of motor torque, there is not caused a variation of driving force at the time of engagement of the engine clutch 8 even if the torque transfer capacity of the engine clutch 8 is increased.

Figure 8:
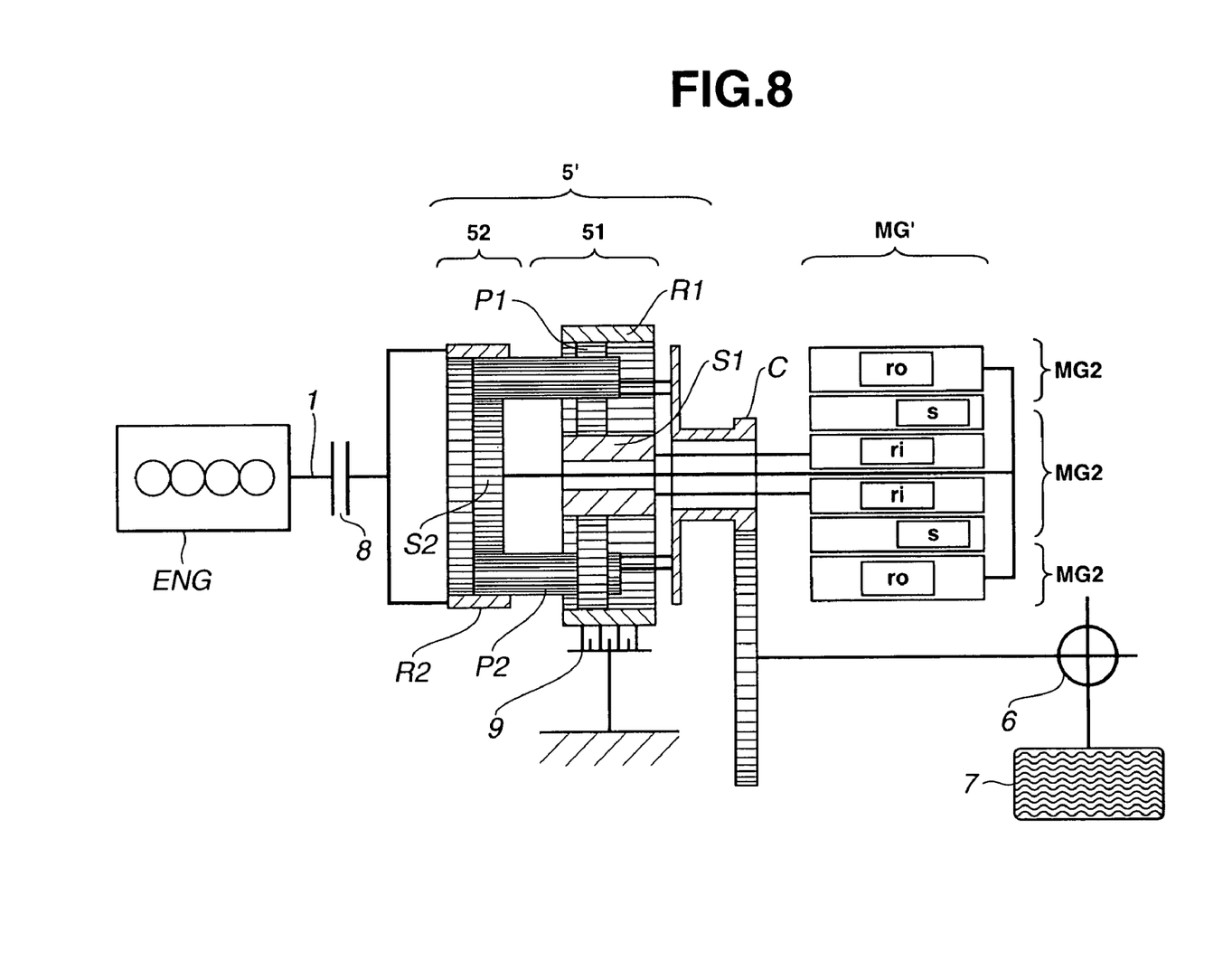
FIG. 8 is a schematic view of a hybrid transmission device according to a second embodiment of the present invention.

FIG. 8 shows a driving force control apparatus for a hybrid vehicle according to a second embodiment of the present invention. In the second embodiment, a hybrid transmission includes a Ravigneaux type planetary gear unit and a motor/generator that is constituted by a composite current two phase motor MG'.

The hybrid vehicle includes engine ENG, Ravigneaux type planetary gear mechanism 5' and composite current two-phase motor MG' which are arranged coaxially and in this order from the left-hand side in the figure.

Ravigneaux type planetary gear mechanism 5' consists of single pinion planetary gear unit 52 and double-pinion planetary gear unit 51 which include pinion P2 in common. Single pinion planetary gear unit 52 is constructed to have sun gear S2 and ring gear R2 that are meshed with pinion P2. Double pinion planetary gear unit 51 includes sun gear S1, ring gear R1 and large-diameter pinion P1 in addition to common pinion P2. Large-diameter pinion P1 is meshed with three other gears, i.e., sun gear S1, ring gear R1 and common pinion P1. Pinions P1, P2 of planetary gear mechanisms 51, 52 are all rotatably supported by common carrier C. Ravigneaux type planetary gear 5' structured as above includes seven rotatable members, i.e., sun gear S1, sun gear S2, ring gear R1, ring gear R2, pinion P1 and pinion P2 as major elements and constitute a two-degree-freedom differential in which when the rotation speeds of two of the seven members are determined, the rotation speeds of other members are determined.

In such Ravigneaux type planetary gear mechanism, rotation of engine ENG disposed coaxially on the left-hand side in the figure is inputted to ring gear R2 of single pinion planetary gear 52 by way of engine clutch 8. On the other hand, so that the output rotation from Ravigneaux planetary gear mechanism is taken out from common carrier C, carrier C is connected to a vehicle drive output (for example, final reduction mechanism 6 including a differential gear and driving wheels 7 in FIG. 8). Ring gear R1 of double pinion type planetary gear unit 51 is provided with low brake 9 so as to be connectable with a transmission case. Engine clutch 8 and low brake 9 are constituted by wet type multi-plate clutches.

Compound-current double-layer motor MG' includes inner rotor ri and annular outer rotor ro surrounding inner rotor ri. Inner and outer rotors ri, ro are arranged coaxially and rotatably supported on a rear axial end of the transmission case. Stator s made up of an annular coil is disposed coaxially in an annular space defined between inner rotor ri and outer rotor ro and fixedly connected to the transmission case. Thus, by stator s and outer rotor ro is constituted second motor/generator MG2. By stator s and inner rotor ri is constituted first motor/generator MG1. When compound multiphase alternating current is supplied to each of first and second motor/generators MG1, MG2, each of motor/generators MG1, MG2 functions as an electric motor which outputs a rotational force having a rotational direction corresponding to a current direction and a rotation speed corresponding to a current strength of the supplied current. When no compound multiphase alternating current is supplied to each of first and second motor/generators MG1, MG2, each of motor/generators MG1, MG2 functions as a generator which outputs an electric power corresponding to rotation thereof caused by an external force. At the time of connection between compound-current double-layer motor MG' and Ravigneaux planetary gearset 5', first motor/generator MG1 (specifically, inner rotor ri) is connected to sun gear S1 of double pinion planetary gearset 51 and first motor/generator MG1 (specifically, outer rotor ro) is connected to sun gear S2 of single pinion planetary gearset 52.

If ring gear R1 is connected to the transmission case by low brake 9, the degree-of-freedom of the rotary system of Ravigneaux planetary gearset 5' is decreased by one so that Ravigneaux planetary gearset 5' is one-degree-of-freedom. Hereinafter, it is determined that a fixed transmission mode is caused at the time of application of low brake 9 and a continuously variable transmission ratio mode is caused at the time of release of low brake 9. Further, it is determined that an operation mode in which engine clutch 8 is engaged and engine ENG is in operation is a hybrid mode and an operation mode in which engine clutch 8 is disengaged and engine ENG is not in operation is an electric vehicle mode. Accordingly, by the combination of two modes in which low brake 9 is applied and two modes in which engine clutch 8s is engaged, there can be attained four modes.

In the second embodiment, the driving force control apparatus of the first embodiment can be used at the time of engagement of engine clutch 8 when the hybrid transmission is in the fixed transmission ratio mode and can produce substantially the same effect as in the hybrid transmission of the first embodiment.

The entire contents of Japanese Patent Application P2003-378530 (filed Nov. 7, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, the hybrid transmission for a hybrid vehicle to which the driving force control apparatus of the present invention is applied is not limited to the structure having been described with respect to the first and second embodiments but the present invention can be applied to a hybrid vehicle having a power transmission mechanism that outputs power by adding the power of a motor/generator to the power of an engine and an engine clutch that selectively engaging the engine with the power transmission mechanism. The scope of the invention is defined with reference to the following claims.

What is claimed is:

1. A driving force control apparatus for a hybrid vehicle having an engine, a motor/generator, a transmission for transmitting powers of the engine and the motor/generator to driving wheels of the vehicle, and an engine clutch disposed between the engine and the transmission, the driving force control apparatus comprising:
    a target driving torque determining section that determines a target driving torque based on an accelerator opening degree and a vehicle speed;
    a compensating torque calculating section that calculates a compensating torque for compensating for decrease in a vehicle driving force otherwise caused at the time of engagement of the engine clutch;
    a vehicle-driving motor torque calculating section that calculates a vehicle-driving motor torque by subtracting the compensating torque from a maximum motor torque of the motor/generator;
    an engagement instructing section that instructs the engine clutch to start engagement; and
    a driving torque correcting section that corrects the target driving torque to a corrected target driving torque that can be realized by the vehicle-driving motor torque after engagement of the engine clutch is started and before the engagement of the engine clutch is completed.

2. A driving force control apparatus according to claim 1, wherein the engagement instructing section is configured to instruct the engine clutch to start engagement when an accelerator opening degree becomes equal to or larger than an engagement start determination accelerator opening degree corresponding to the corrected target driving torque.

3. A driving force control apparatus according to claim 2, wherein the engagement instructing section is configured to assume that a final accelerator opening degree and the target driving torque become larger as an accelerator depression speed becomes higher and set smaller an accelerator opening degree in response to which engagement of the engine clutch is started as the accelerator depression speed becomes higher.

4. A driving force control apparatus according to claim 3, wherein the engagement instructing section is configured to increase a torque transfer capacity of the engine clutch at the time of engagement of the engine clutch as the accelerator depression speed becomes higher.

5. A driving force control apparatus for a hybrid vehicle having an engine, at least one motor/generator, a transmission for transmitting power to an output shaft connected to driving wheels of the vehicle after combining powers of the engine and the motor/generator, and an engine clutch disposed between the engine and the transmission for controlling transfer of power therebetween, in which a mode of operation of the vehicle is switched between a hybrid mode in which the vehicle is driven by the powers of the engine and the motor/generator and an electric vehicle mode in which the vehicle is driven only by the power of the motor/generator, the hybrid mode being attained by engagement of the engine clutch and the electric vehicle mode being attained by disengagement of the engine clutch, the driving force control apparatus comprising:

target driving torque determining means for determining a target driving torque based on an accelerator opening degree and a vehicle speed;

compensating torque calculating means for calculating a compensating torque for compensating decrease in a vehicle driving force otherwise caused due to dragging of the engine clutch at the time of engagement of the engine clutch;

vehicle-driving motor torque calculating means for calculating a vehicle-driving motor torque by subtracting the compensating torque from a maximum motor torque of the motor/generator;

engagement instructing means for instructing the engine clutch to start engagement; and driving force correcting means for correcting the target driving force to a corrected target driving force that can be realized by the vehicle-driving motor torque after engagement of the engine clutch is started and before the engagement of the engine clutch is completed.

6. A driving force control apparatus according to claim 5, wherein the engagement instructing means instructs the engine clutch to start engagement when an accelerator opening degree becomes equal to or larger than an engagement start determination accelerator opening degree corresponding to the corrected target driving torque.

7. A driving force control method for a hybrid vehicle having an engine, at least one motor/generator, a transmission for transmitting powers of the engine and the motor/generator to driving wheels of the vehicle, and an engine clutch disposed between the engine and the transmission, the driving force control method comprising:

determining a target driving torque from an accelerator opening degree and a vehicle speed;

calculating a compensating torque for compensating for decrease in a vehicle driving force otherwise caused at the time of engagement of the engine clutch;

calculating a vehicle-driving motor torque by subtracting the compensating torque from a maximum motor torque of the motor/generator;

instructing the engine clutch to start engagement; and correcting the target driving torque to a corrected target driving torque that can be realized by the vehicle-driving motor torque after engagement of the engine clutch is started and before the engagement of the engine clutch is completed.

8. A driving force control method according to claim 7, wherein the instructing comprises instructing the engine clutch to start engagement when an accelerator opening degree becomes equal to or larger than an engagement start determination accelerator opening degree corresponding to the corrected target driving torque.

9. A driving force control method according to claim 8, wherein the instructing comprises assuming that a final accelerator opening degree and the target driving torque become larger as an accelerator depression speed becomes higher and set smaller an accelerator opening degree in response to which engagement of the engine clutch is started as the accelerator depression speed becomes higher.

10. A driving force control method according to claim 9, wherein the instructing comprises increasing a torque transfer capacity of the engine clutch at the time of engagement of the engine clutch as the accelerator depression speed becomes higher.

* * * * *